United States Patent
Davis et al.

(10) Patent No.: US 6,810,727 B1
(45) Date of Patent: Nov. 2, 2004

(54) TIRE PRESSURE MONITORING SYSTEM ALGORITHM FOR DUAL PLACARD APPLICATIONS

(75) Inventors: Michael Allan Davis, Troy, MI (US); Thomas H. Tu, Troy, MI (US); Ryan M. Frakes, Grand Blanc, MI (US); Stephen C. Kirsch, Sterling Hts., MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/646,549

(22) Filed: Aug. 21, 2003

(51) Int. Cl.⁷ .............................................. B60C 23/02
(52) U.S. Cl. .................................................... 73/146.2
(58) Field of Search ............................... 73/146, 146.2, 73/146.3, 146.4, 146.5, 146.8

(56) References Cited

U.S. PATENT DOCUMENTS

2004/0030574 A1 * 2/2004 DiCostanzo et al. ........... 705/1

* cited by examiner

Primary Examiner—Edward Lefkowitz
Assistant Examiner—Andre Alen
(74) Attorney, Agent, or Firm—Laura C. Hargitt

(57) ABSTRACT

A dual placard algorithm implemented in a tire pressure monitoring system which responds to tire inflation changes caused by the driver, and is thereby able to allow the tire pressure monitoring system to detect low tire pressure in dual placard applications. The algorithm automatically sets the threshold appropriate for a high placard pressure recommendation in the event the driver has inflated the rear tires to the high placard pressure recommendation. If the driver subsequently changes the rear tire pressure to the low placard pressure recommendation, the dual placard algorithm alerts the driver to manually enter a learn mode, whereupon the algorithm automatically re-sets the threshold to that appropriate for the low placard pressure recommendation only if the driver has deflated both rear tires to the low placard tire pressure recommendation.

10 Claims, 2 Drawing Sheets

TIRE PRESSURE MONITORING SYSTEM ALGORITHM FOR DUAL PLACARD APPLICATIONS

TECHNICAL FIELD

The present invention relates to tire pressure monitoring systems, and in particular to implementing algorithms therefor. Still more particularly, the present invention relates to a tire pressure monitoring system algorithm for use with vehicles having dual placards for recommended rear tire pressures.

BACKGROUND OF THE INVENTION

Recommended tire pressures are provided by motor vehicle manufacturers in the form of placards, usually located on the driver's side door for ready reference by the driver. Motor vehicle tire pressures should be maintained by the driver at the placard tire pressure recommendations for safe vehicle operation and optimized ride and handling.

An interesting aspect in this regard are pick-up trucks and certain other motor vehicles, in that they are at various times operated with or without loads applied to the rear axle. These loads can be the result of cargo in the vehicle and/or trailering. These motor vehicles have a high rear placard tire pressure recommendation which is applicable when the vehicle is under a load condition. These motor vehicles further have a low rear placard tire pressure recommendation which is applicable when the vehicle is operated in an unloaded condition. This dual placard application presumes the driver would change the rear tire pressures to the proper placard recommendation depending on the load condition of the vehicle. By operating the vehicle at the proper tire pressure placard recommendation, ride, handling and overall vehicle operation are optimized to suit the load condition of the vehicle. By way of example, the high placard tire pressure recommendation could be about 80 psi, and the low placard tire pressure recommendation could be about 53 psi.

The National Highway Traffic Safety Administration (NHTSA) now requires motor vehicle manufacturers to implement a tire pressure monitoring system to alert a driver to a low tire pressure condition. At present, the NHTSA requires the driver be alerted should the tire pressure drop below the greater of: 1) 75% of the placard tire pressure recommendation or 2) a minimum activation pressure defined in FMVSS 138 for the specific tires on the vehicle.

FIGS. 1 and 2 depict a motor vehicle 10 having a conventional tire pressure monitoring system 12 and an algorithm 50 for its implementation.

Referring firstly to FIG. 1, the tire pressure monitoring (TPM) system 12 includes an implementing microprocessor, electronics and software. The TPM system 12 is connected by a data links 14 to tire pressure sensors 16a, 16b, one for each tire of the vehicle (only the rear tires 18a, 18b being shown). Each tire pressure sensor 16a, 16b are pneumatically interfaced with its respective tire 18a, 18b and senses the pressure $P_1$, $P_2$ respectively therewithin. In the event the TPM system 12 determines a tire has a pressure that is not above a predetermined threshold, a signal device 22, as for example a warning light on the dashboard, is activated via a connection 24.

Referring now to FIG. 2, the software of the TPM system 12 implements the algorithm 50. At execution Block 52 the TPM system 12 is initialized automatically, for example when the ignition key is switched to the ON position. At execution Block 54, the algorithm acquires the tire pressure data from all the tire pressure sensors. At decision Block 56, the algorithm inquires whether the tire pressures are above the threshold appropriate for the placard pressure recommendation (for example that appropriate for compliance with FMVSS 138). If not, the algorithm causes the TPM system 12 to activate the warning signal 22 at execution Block 58. Otherwise, the algorithm returns to execution Block 54 and repeats the aforesaid steps with a predetermined periodicity.

Problematically, in vehicles having dual placard tire pressure recommendations the conventional TPM system 12 is not suited to provide a low tire pressure warning for the tires under dual placard. There are several reasons for this. One is that if the threshold in Block 56 is set for high placard pressure threshold, then when the driver changes the tire pressure to the low placard pressure, the warning signal will be activated. The other reason is that if the threshold is set for the low placard pressure threshold and the tires are inflated to the high placard pressure, then the TPM system 12 will not recognize a low pressure problem at the high placard pressure threshold.

Therefore, what remains needed in the art is a tire pressure monitoring algorithm which is operable in dual placard applications.

SUMMARY OF THE INVENTION

The present invention is a dual placard algorithm implemented in a tire pressure monitoring system which responds to tire inflation changes caused by the driver, and is thereby able to allow the tire pressure monitoring system to detect low tire pressure in dual placard applications.

Based upon tire pressure data acquisition by a TPM system, the dual placard algorithm according to the present invention automatically sets the threshold of the TPM system algorithm to that appropriate for the high placard pressure in the event the driver has inflated the rear tires to the high placard pressure recommendation. If the driver subsequently deflates the rear tire pressure to the low placard pressure recommendation, the dual placard algorithm alerts the driver, through the TPM system, that the pressure is low for the current high pressure placard and that the threshold for detecting a rear tire low tire pressure condition must be re-set. The driver then is required to take appropriate action. This action is to check the tires if the threshold is already set for that appropriate for the low placard pressure recommendation, or to cause the dual placard algorithm to enter a "learn mode" in order to automatically re-set the threshold to that appropriate for the low placard pressure recommendation if the threshold is still set for that appropriate for the high placard pressure recommendation even though the rear tires were deflated to the low placard pressure recommendation. The dual placard algorithm can select the threshold appropriate for the low placard pressure recommendation only if the driver has deflated both rear tires to the low placard tire pressure recommendation.

It will be appreciated that the dual placard algorithm according to the present invention automatically maintains FMVSS 138 compliance in dual placard applications, eliminates need for a driver to select by a switch whether the vehicle is operating in a load or no load condition (that is, the threshold selection is appropriate for the high or low placard pressure recommendation), and further alerts the driver of an inappropriate threshold in the event the tire pressure has been changed from the high to the low placard pressure recommendation.

Accordingly, it is an object of the present invention to provide a dual placard algorithm implemented in a tire pressure monitoring system which responds to tire inflation changes caused by the driver, and is thereby able to allow the tire pressure monitoring system to detect low tire pressure in dual placard applications.

This and additional objects, features and advantages of the present invention will become clearer from the following specification of a preferred embodiment.

DESCRIPTION OF THE PREFERRED EMBODIMENT

Figure 1:
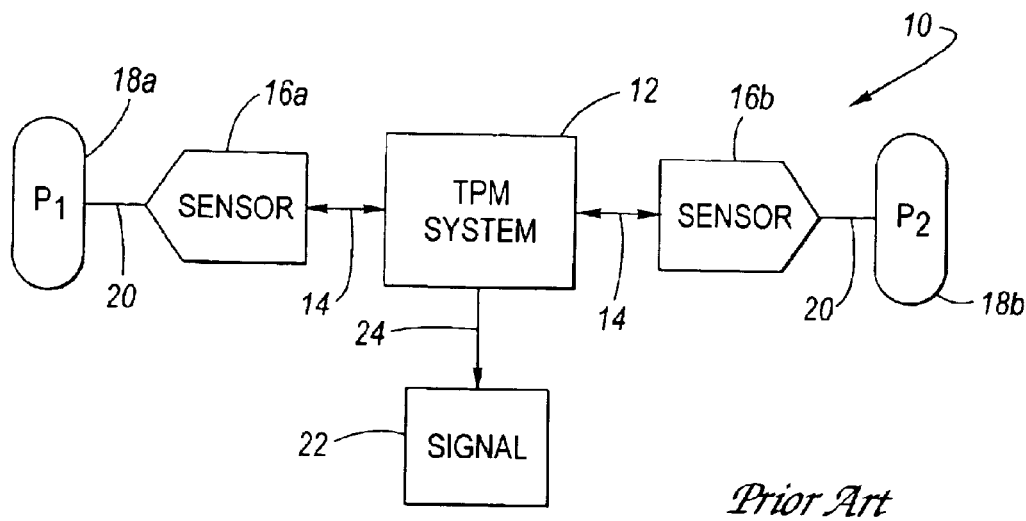
FIG. 1 is a schematic view of a motor vehicle and prior art tire pressure monitoring system therefor.
Figure 2:
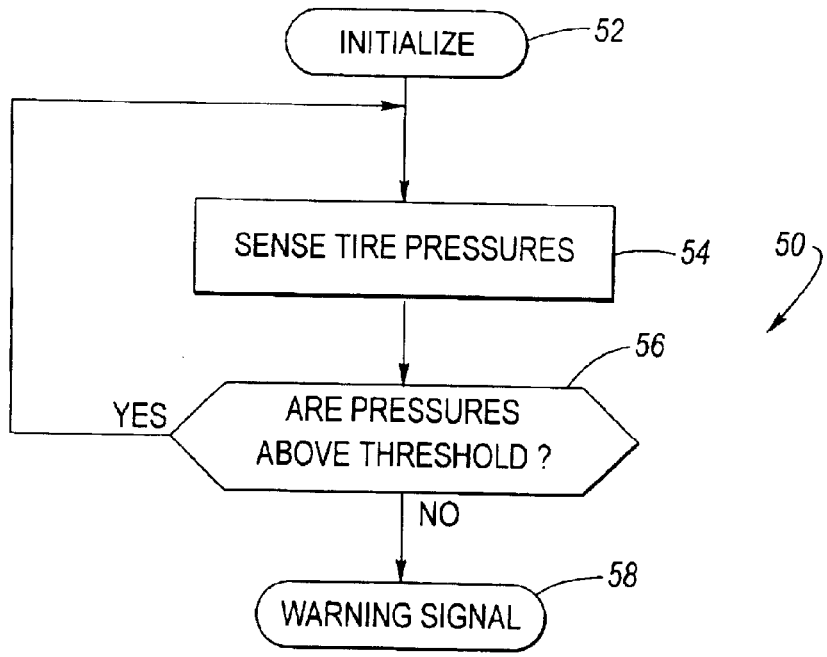
FIG. 2 is a flow chart for a prior art tire pressure monitoring system algorithm which implements the prior art tire pressure monitoring system of FIG. 1.
Figure 3:
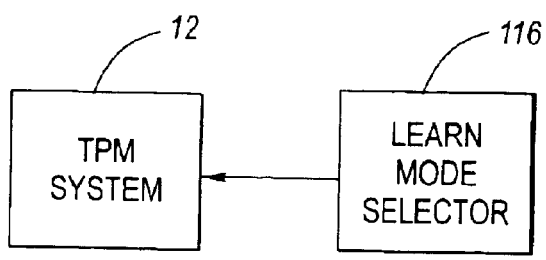
FIG. 3 is a schematic view of the prior art tire pressure monitoring system from FIG. 1, now equipped with a learn mode selector.
Figure 4:
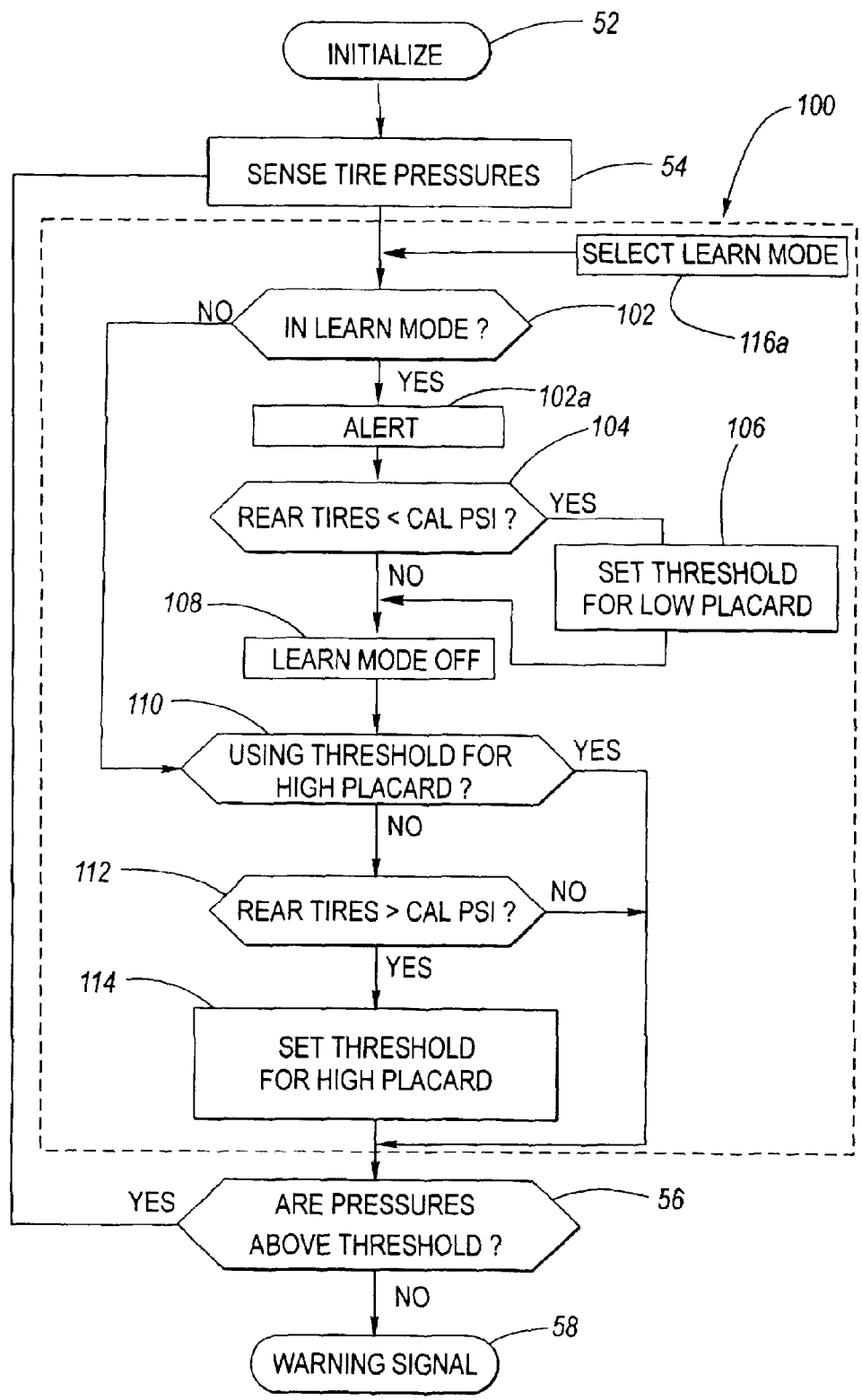
FIG. 4 is a flow chart of a dual placard algorithm according to the present invention, shown operatively with respect to a tire pressure monitoring system algorithm.

Referring now to the Drawing, FIGS. 3 and 4 depict the dual placard algorithm 100 in an exemplar environment of operation with respect to a tire pressure monitoring (TPM) system algorithm 50 as discussed with respect to FIG. 2 which implements a TPM system 12 now further equipped with a learn mode selector 116, wherein the purpose of the learn mode selector will become clear from the discussion hereinbelow. In this regard, it is to be understood that the dual placard algorithm 100 may be used with other TPM system algorithms and other TPM systems from that shown at FIGS. 1 and 2.

Referring now with particularity to FIG. 4, decision Block 102 receives tire pressure data from a TPM algorithm of a TPM system, as for example above described execution Block 54, wherein the rear tire pressure sensors are individually polled. Decision Block 102 inquires whether the dual placard algorithm 100 has been placed by the driver into a "learn mode," the nature of which will be discussed hereinbelow. If the result of the inquiry is that the dual placard algorithm is not in learn mode, then the dual placard algorithm goes directly to decision Block 110.

Decision Block 10 inquires whether the selected threshold is that appropriate for the high placard tire pressure recommendation. If the result of this inquiry is yes, then the dual placard algorithm 100 returns to the TPM algorithm, as for example to decision Block 56. If the result of the inquiry is no, this means the presently selected threshold is that appropriate for the low placard pressure recommendation, and the dual placard algorithm 100 proceeds to decision Block 112.

Decision Block 112 inquires whether both rear tires have a pressure above a predetermined calibration pressure, using the aforementioned tire pressure data from, for example, the individual rear tire pressure sensor polling at execution Block 54. The calibration pressure is a selected pressure between the threshold appropriate for the high placard pressure recommendation and the high placard pressure recommendation. For example, if the high pressure placard recommendation is 80 psi, and the threshold appropriate for the high placard pressure recommendation is 60 psi, then the calibration pressure could be 70 psi (in this example, the low pressure placard recommendation could be 53 psi and the threshold appropriate for the low pressure placard recommendation could be 46 psi). If the result of the inquiry of decision Block 112 is no, then the dual placard algorithm 100 exits to the TPM algorithm, as for example to decision Block 56. If the result of this inquiry is yes, then the dual placard algorithm 100 proceeds to execution Block 114.

At execution Block 114, the dual placard algorithm 100 re-sets the threshold by selection of the threshold appropriate for the high placard pressure recommendation, and then returns to the TPM algorithm, as for example to decision Block 56.

It will be seen from the foregoing that Blocks 110 through 114 serve to automatically change the threshold from that appropriate for the low placard pressure recommendation to the threshold appropriate for the high placard pressure recommendation in the event the driver has increased the rear tire pressure from the low to the high placard pressure recommendation.

In the event the driver subsequently deflates the tires to the low placard pressure recommendation from the high placard pressure recommendation, the following aspects of the dual placard algorithm will cause the driver to interact therewith and, as a result of that interaction, the dual placard algorithm will automatically select the threshold appropriate for the low placard pressure recommendation.

Returning to the discussion of decision Block 102, if the driver has deflated the tires from the high placard pressure recommendation to the low placard pressure recommendation, and the dual placard algorithm 100 is not in learn mode, then the dual placard algorithm will go to decision Block 110, and since the result of its inquiry will be yes, the dual placard algorithm will exit to the TPM algorithm, which in this example is at decision Block 56. The TPM algorithm will inquire, as for example at decision Block 56, whether the tire pressure is above the selected threshold. Since the set threshold is that appropriate for the high placard pressure recommendation, the result of the inquiry will be no, in which case the TPM algorithm provides an alert signal of low tire pressure, as for example via execution Block 58.

With a low tire pressure warning signal activated, the driver now must take action. This action is to either check the tire pressures and/or to place the dual placard algorithm 100 into learn mode so that the threshold can be re-set to that appropriate for the low placard pressure recommendation. To place the dual placard algorithm into learn mode, the driver actuates the learn mode selector 116, wherein the manual selection of learn mode is indicated in the dual placard algorithm 100 by execution Block 116a. While the learn mode selector 116 could be a special switch for this purpose, it is preferred that other devices having modes selectable to the driver and already present in the motor vehicle be used. For example, with the ignition key in the ON position, the light switch could be turned on and off in succession 4 times within 4 seconds by the driver to thereby cause the dual placard algorithm 100 to enter into learn mode. With the result of the inquiry of decision Block 102 being yes, it is preferred for the dual placard algorithm 100 to acknowledge that it has entered learn mode by some alert, such as by a horn chirp and/or a lights flash at execution Block 102a.

The dual placard algorithm 100 then advances to decision Block 104, whereat an inquiry is made as to whether both rear tires have a pressure below the calibration pressure, wherein this inquiry uses the tire pressure data of the TPM system mentioned hereinabove, as for example via individual rear tire pressure sensor polling at execution Block 54. If the answer to this inquiry is no, then the dual placard algorithm 100 goes to execution Block 108, whereat learn mode is disabled, and then advances to decision Block 110 and thereafter further advances as indicated hereinabove. If the answer to the inquiry is yes, then the dual placard algorithm 100 goes to execution Block 106.

At execution Block 106 the dual placard algorithm 100 re-sets the threshold by selecting the threshold appropriate for the low placard pressure recommendation. The dual placard algorithm 100 then advances to execution Block 108, whereat learn mode is disabled, and then advances to decision Block 110, and thereafter further advances as indicated hereinabove.

It will be seen from the foregoing description, that in dual placard applications, should the driver raise the rear tire pressure to the high placard pressure recommendation from the low placard pressure recommendation, then the dual placard algorithm, in conjunction with a TPM system and its TPM system algorithm, will automatically select the threshold appropriate for the high placard pressure recommendation. It will further be seen from the foregoing description, that in dual placard applications, should the driver lower the rear tire pressure to the low placard pressure recommendation from the high placard pressure recommendation, then the dual placard algorithm, in conjunction with a TPM system and its TPM system algorithm, will automatically warn the driver that the threshold is inappropriate, and requires manual entry into learn mode. Once set into learn mode, the dual placard algorithm automatically selects the threshold appropriate for the low placard pressure recommendation.

To those skilled in the art to which this invention appertains, the above described preferred embodiment may be subject to change or modification. Some motor vehicles have four rear tires; as such, the number of rear tires in which the dual placard algorithm is applicable to is not restricted to merely two rear tires (which has been discussed hereinabove merely by example), but is, rather, applicable to any number of rear tires. Such change or modification can be carried out without departing from the scope of the invention, which is intended to be limited only by the scope of the appended claims.

What is claimed is:

1. A method for selecting an appropriate threshold for a motor vehicle tire pressure monitoring system in dual placard pressure recommendation applications, comprising the steps of:
   detecting tire pressure;
   determining whether a first threshold appropriate for a high placard pressure recommendation is selected;
   determining whether the tire pressure is above a predetermined calibration pressure;
   selecting the first threshold if the first threshold was not selected and the tire pressure is above the calibration pressure;
   signaling in response to detection of tire pressure below the first threshold and the first threshold has been selected;
   entering into a learn mode during said step of signaling in response to a manual selection of the learn mode; and
   selecting a second threshold appropriate for a low placard pressure recommendation in response to entry into the learn mode and detection of a tire pressure below the calibration pressure.

2. The method of claim 1, wherein said step of detecting comprises:
   detecting individual tire pressure of each rear tire of the motor vehicle.

3. The method of claim 2, wherein said second step of determining and said first step of selecting comprise:
   determining whether the tire pressure in each and every rear tire of the motor vehicle is above the predetermined calibration pressure; and
   selecting the first threshold if the first threshold was not selected and the tire pressure of each and every rear tire of the motor vehicle is above the calibration pressure.

4. The method of claim 3, wherein the detection of said second step of selecting comprises:
   detection of tire pressure of each and every rear tire of the motor vehicle below the calibration pressure.

5. The method of claim 4, wherein said calibration pressure comprises:
   a selected pressure between the first threshold and the high placard pressure recommendation.

6. A method for implementing a motor vehicle tire pressure monitoring system in dual placard pressure recommendation applications, comprising the steps of:
   detecting tire pressure;
   determining whether a first threshold appropriate for a high placard pressure recommendation is selected;
   determining whether the tire pressure is above a predetermined calibration pressure;
   selecting the first threshold if the first threshold was not selected and the tire pressure is above the calibration pressure;
   signaling in response to detection of tire pressure below the first threshold and the first threshold has been selected;
   entering into a learn mode during said step of signaling in response to a manual selection of the learn mode;
   selecting a second threshold appropriate for a low placard pressure recommendation in response to entry into the learn mode and detection of a tire pressure below the calibration pressure; and
   signaling in response to detection of tire pressure below the second threshold.

7. The method of claim 6, wherein said step of detecting comprises:
   detecting individual tire pressure of each rear tire of the motor vehicle.

8. The method of claim 7, wherein said second step of determining and said first step of selecting comprise:
   determining whether the tire pressure in each and every rear tire of the motor vehicle is above the predetermined calibration pressure; and
   selecting the first threshold if the first threshold was not selected and the tire pressure of each and every rear tire of the motor vehicle is above the calibration pressure.

9. The method of claim 8, wherein the detection of said second step of selecting comprises:
   detection of tire pressure of each and every rear tire of the motor vehicle below the calibration pressure.

10. The method of claim 9, wherein said calibration pressure comprises:
    a selected pressure between the first threshold and the high placard pressure recommendation.

* * * * *